United States Patent
Mori et al.

(10) Patent No.: US 11,253,863 B2
(45) Date of Patent: Feb. 22, 2022

(54) CONTAINER STORING WASHING SOLUTION USED FOR BLOOD ANALYZER

(71) Applicant: Sysmex Corporation, Kobe (JP)

(72) Inventors: Yusuke Mori, Kobe (JP); Kinya Uchihashi, Kobe (JP); Yumiko Mizuno, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 1234 days.

(21) Appl. No.: 13/729,777

(22) Filed: Dec. 28, 2012

(65) Prior Publication Data

US 2013/0255725 A1  Oct. 3, 2013

(30) Foreign Application Priority Data

Mar. 30, 2012  (JP) ................... JP2012-081563

(51) Int. Cl.
*B01L 3/00* (2006.01)
*G01N 35/10* (2006.01)
*B65D 1/09* (2006.01)
*B65D 85/00* (2006.01)

(52) U.S. Cl.
CPC ............. *B01L 3/565* (2013.01); *B01L 3/5453* (2013.01); *B01L 13/02* (2019.08); *B65D 1/09* (2013.01); *G01N 35/1004* (2013.01); *B01L 3/50825* (2013.01); *B01L 2200/0689* (2013.01); *B01L 2200/12* (2013.01); *B01L 2300/044* (2013.01); *B01L 2300/0854* (2013.01); *B65D 85/70* (2013.01)

(58) Field of Classification Search
CPC ......... B65D 1/09; G01N 33/48; B01L 3/5453; B01L 3/565; B01L 2300/044; B01L 13/02
See application file for complete search history.

(56) References Cited

U.S. PATENT DOCUMENTS

| 4,132,594 A | 1/1979 | Bank et al. |
| 4,837,047 A | 6/1989 | Sato et al. |
| 4,985,026 A * | 1/1991 | Kasai .................... B01L 3/5082 422/914 |

(Continued)

FOREIGN PATENT DOCUMENTS

| DK | 1541334 A1 * | 6/2005 | ............... B32B 7/02 |
| JP | 01-310640 A | 12/1989 | |

(Continued)

OTHER PUBLICATIONS

Machine translation of JP 2003254980 A, dated Sep. 2003.*

(Continued)

*Primary Examiner* — Joseph L. Perrin
*Assistant Examiner* — Kevin G Lee
(74) *Attorney, Agent, or Firm* — Crowell & Moring LLP

(57) ABSTRACT

This container storing a washing solution for a blood analyzer includes a container body made of thermoplastic resin resistant against a chlorine-based washing solution and provided with an opening on an upper portion, a chlorine-based washing solution stored in the container body, and a multilayer film covering the opening. The multilayer film includes a seal layer heat-sealed to the container body thereby blocking the opening and a gas barrier layer arranged on the outer side of the seal layer.

13 Claims, 9 Drawing Sheets

(56) References Cited

U.S. PATENT DOCUMENTS

| | | | |
|---|---|---|---|
| 5,033,476 A * | 7/1991 | Kasai | A61B 5/15003 600/576 |
| 5,098,661 A | 3/1992 | Froehlich et al. | |
| 5,326,534 A | 7/1994 | Yamazaki et al. | |
| 5,359,184 A | 10/1994 | Froehlich et al. | |
| 6,146,726 A * | 11/2000 | Yoshii | B32B 27/08 428/34.9 |
| 7,112,370 B2 * | 9/2006 | Suzuki | C04B 35/03 428/412 |
| 2006/0212020 A1 * | 9/2006 | Rainen | A01N 1/02 604/403 |
| 2009/0061057 A1 | 3/2009 | Beckwith et al. | |
| 2009/0110888 A1 * | 4/2009 | Wuest | B32B 27/28 428/200 |

FOREIGN PATENT DOCUMENTS

| | | |
|---|---|---|
| JP | 02-162229 A | 6/1990 |
| JP | 04-503566 A | 6/1992 |
| JP | 07-041465 Y2 | 9/1995 |
| JP | 07-255821 A | 10/1995 |
| JP | 2588793 Y2 | 1/1999 |
| JP | 2591521 Y2 | 3/1999 |
| JP | 2003-254980 A | 9/2003 |
| JP | 2003246000 A * | 9/2003 |
| JP | 2009-025144 A | 2/2009 |
| JP | 3153227 U | 8/2009 |

OTHER PUBLICATIONS

Sysmex SF-3000 Hematology Analyzer—Instruction manual, dated Mar. 2001.*
Human translation of JP 2003246000 A, dated Sep. 2003.*
Brazilian Office Action dated May 19, 2020 in a counterpart Brazilian patent application No. BR102012033347-3.
Extended European Search Report in Europe Application No. 20157910.9, dated Mar. 9, 2020, 9 pages.

* cited by examiner

FIG.10A (a) TRANSITION OF pH AND AVAILABLE CHLORINE CONCENTRATION IN EXAMPLE 1

| 45°C PRESERVATION PERIOD | INITIAL VALUE | 6 DAYS | 13 DAYS | 26 DAYS | 39 DAYS |
|---|---|---|---|---|---|
| IN TERMS OF 30°C PRESERVATION | 0 | 2 WEEKS | 1 MONTHS | 2 MONTHS | 3 MONTHS |
| pH | 12.17 | 12.10 | 12.07 | 11.98 | 11.93 |
| AVAILABLE CHLORINE CONCENTRATION (%) | 4.98 | 4.55 | 4.10 | 3.61 | 3.33 |

FIG.10B (b) TRANSITION OF pH AND AVAILABLE CHLORINE CONCENTRATION IN EXAMPLE 2

| 45°C PRESERVATION PERIOD | | INITIAL VALUE | 26 DAYS | 37 DAYS | 52 DAYS | 78 DAYS | 91 DAYS |
|---|---|---|---|---|---|---|---|
| IN TERMS OF 30°C PRESERVATION | | 0 | 2 MONTHS | 2.8 MONTHS | 4 MONTHS | 6 MONTHS | 7 MONTHS |
| pH | Lot1 | 12.15 | 12.09 | 12.12 | 12.05 | 11.69 | 10.82 |
| | Lot2 | 12.19 | 12.18 | 12.13 | 12.08 | 11.89 | 11.50 |
| AVAILABLE CHLORINE CONCENTRATION (%) | Lot1 | 5.09 | 3.48 | 3.25 | 2.69 | 2.09 | 1.85 |
| | Lot2 | 5.03 | 3.54 | 3.22 | 2.75 | 2.17 | 1.93 |

FIG.11

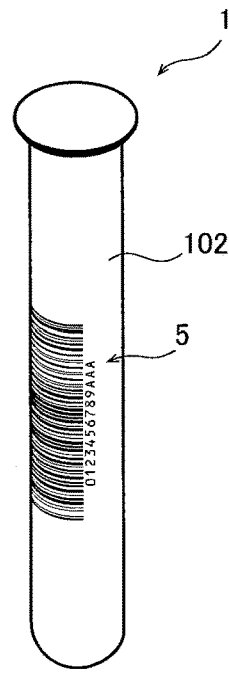

CONTAINER STORING WASHING SOLUTION USED FOR BLOOD ANALYZER

RELATED APPLICATIONS

This application claims priority under 35 U.S.C. § 119 to Japanese Patent Application No. 2012-081563 filed on Mar. 30, 2012, the entire content of which is hereby incorporated by reference.

BACKGROUND OF THE INVENTION

Field of the Invention

The present invention relates to a container storing a washing solution used for a blood analyzer. The present invention also relates to a method for washing a flow system of a blood analyzer.

Background Art

A blood analyzer, that is configured to aspirate a blood specimen with a pipette and measure the aspirated blood specimen to analyze components contained in the specimen, is known. As the blood analyzer is used, contaminants such as cell residues and blood cell protein contained in the blood accumulate in a fluid system constituted of the pipette, flow path, valves and detector. It may cause reduction in measurement accuracy. Therefore, the fluid system should be periodically washed with a washing solution.

Japanese laid-open patent No. 2003-254980 discloses a blood analyzer automatically washing a fluid system with a washing solution. It also discloses a washing solution container used for this blood analyzer. The washing solution container is in the form of a tube provided with an opening on the upper end. The upper opening is sealed with a lid member. A label having a bar code printed thereon is attached to the washing solution container. The washing solution container is substantially identical in size and shape to a blood collection tube storing a blood specimen. Therefore, the operator can load the washing solution container on a rack in a similar manner to the blood collection tube. It makes it possible to have the washing solution in the container be subjected to automatic aspiration by the blood analyzer similarly to the blood collection tube. The blood analyzer scans a bar code of a container loaded on the rack, and performs a measuring operation when determining, based on the bar code information, that the container contains a blood specimen. When determining that the container contains a washing solution, on the other hand, the blood analyzer performs a washing operation. The aforementioned Japanese laid-open patent No. 2003-254980 discloses a sodium hypochlorite solution as the washing solution.

The aforementioned Japanese laid-open patent No. 2003-254980 has no description about materials preferably employable for the lid member of the blood collection tube and the washing solution container, however, a rubber is generally used as a lid member of the blood collection tube. When a blood is drawn from a patient, lid member of the blood collection tube is pierced with a blood collection needle. Rubber is suitable to seal a through-hole formed by the blood collection needle.

However, rubber is deteriorated when exposed to a sodium hypochlorite solution. If the washing solution container is sealed with a rubber lid, therefore, the rubber may deteriorate upon long-term preservation, to disadvantageously permeate external $CO_2$ into the container. If $CO_2$ is permeated into the container, decomposition of sodium hypochlorite contained in the solution may be promoted to reduce a detergency of the washing solution.

SUMMARY OF THE INVENTION

A first aspect of the present invention is a container storing a washing solution used for a blood analyzer, comprising: a container body, having a form of a blood collection tube, made of thermoplastic resin resistant against a chlorine-based washing solution and provided with an opening on an upper end; a chlorine-based washing solution stored in the container body; and a multilayer film bonded to the container body to seal the opening, wherein an identification code indicating that the container accommodates the washing solution is assigned to the container body, and the multilayer film includes: a seal layer heat-sealed to the container body thereby sealing the opening; and a gas barrier layer arranged on the outer side of the seal layer.

A second aspect of the present invention is a method for washing a flow system of a blood analyzer, the method comprising: loading a washing solution container storing a washing solution on a rack, the washing solution container comprising a container body having a form of a blood collection tube provided with an upper opening and a multilayer film bonded to the container body to seal the upper opening; transporting the rack toward the blood analyzer; obtaining an identification code assigned to the container body; piercing the multilayer film with a pipette provided with the blood analyzer; aspirating the washing solution in the container body by the pipette; and using the aspirated washing solution to wash the flow system of the blood analyzer, wherein the container body is made of thermoplastic resin resistant against a chlorine-based washing solution; and the multilayer film includes: a seal layer heat-sealed to the container body thereby sealing the upper opening; and a gas barrier layer arranged on the outer side of the seal layer.

BRIEF DESCRIPTION OF THE DRAWINGS

FIG. 10A is a table showing test results related to Example 1 of the present invention;

FIG. 10B is a table showing test results related to Example 2 of the present invention; and FIG. 11 is a perspective view showing a modification of the washing solution container according to the embodiment of the present invention.

DETAILED DESCRIPTION OF THE PREFERRED EMBODIMENTS

First, the overall structure of a washing solution container 1 according to the embodiment is described with reference to FIGS. 1 to 6.

Figure 1:
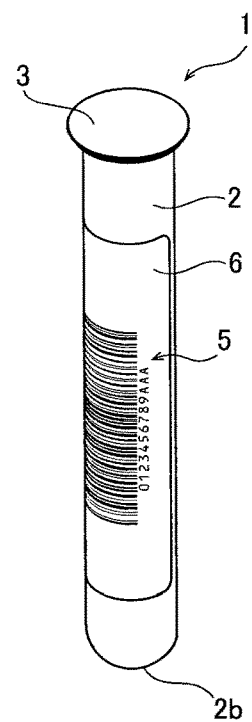
FIG. 1 is a perspective view showing the appearance of a washing solution container according to an embodiment of the present invention.
Figure 2:
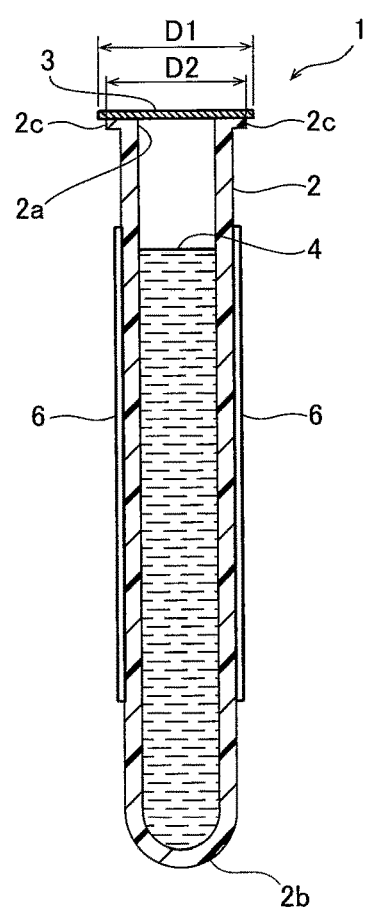
FIG. 2 is a longitudinal sectional view for illustrating the structure of the washing solution container according to the embodiment shown in FIG. 1.

The washing solution container 1 according to this embodiment includes a container body 2 and a multilayer film (lid member) 3 covering an opening 2a (see FIG. 2) of the container body 2, as shown in FIGS. 1 and 2. The washing solution container 1 accommodates a washing solution 4 (see FIG. 2) in the container body 2. The washing solution 4 accommodated in the washing solution container 1 is a hypochlorite solution employed for washing a fluid system of a blood analyzer 100 (see FIG. 4) described later.

The container body 2 has a form of a blood collection tube, in other words, it is formed as like as a blood collection tube. In the present description, "the form of a blood collection tube" denotes the form of a tube, having a bottom portion and including an opening upper portion, corresponding to the form of a blood collection tube employed for the blood analyzer. More specifically, the container body 2 is provided in the form of a cylinder having the circular opening 2a on an upper end and including a semicircular bottom portion 2b. The container body 2 has an outer dimension similar to that of a blood collection tube T (see FIG. 5) employed for the blood analyzer 100. Thus, the container body 2 can be loaded on a rack R (see FIG. 5) in a similar manner to the blood collection tube T. Therefore, an automatic supply of the washing solution container 1 to the blood analyzer 100 is easily realized by loading it on the rack R. An outwardly protruding circular (circumferential) flange portion 2c is formed on an upper end portion of the container body 2, in order to increase an area bonded to the multilayer film 3.

Figure 5:
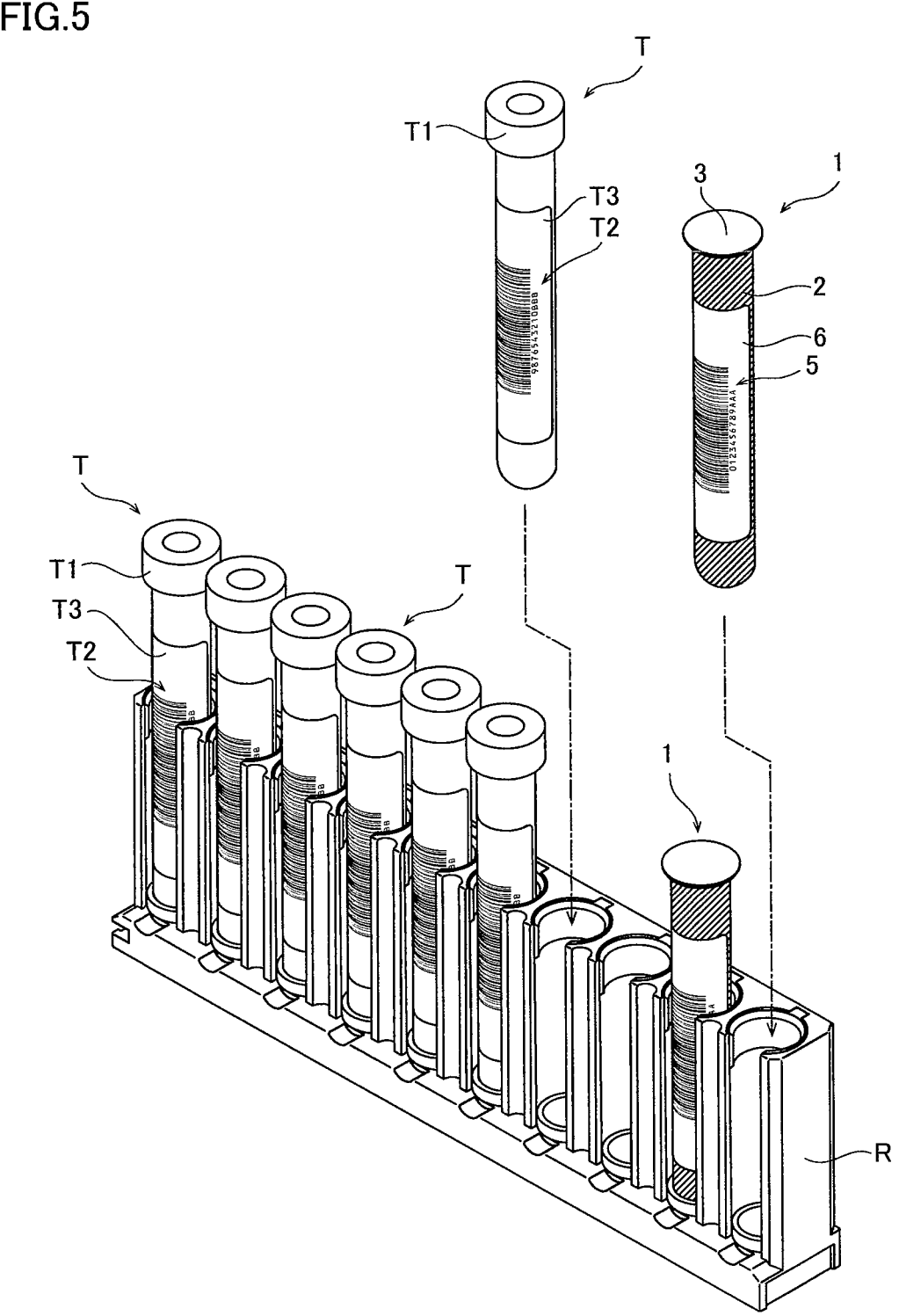
FIG. 5 is a schematic perspective view showing modes of use of blood collection tubes and washing solution containers employed for the blood analyzer shown in FIG. 4.

The container body 2 is made of thermoplastic resin resistant against the hypochlorite solution (sodium hypochlorite solution). Such thermoplastic resin is preferably prepared from olefin-based resin, and more preferably prepared from polyethylene (PE) or polypropylene (PP). The container body 2 made of polyethylene or polypropylene has a semitransparent (opaque) milky-white color in an uncolored state. According to this embodiment, therefore, the container body 2 is made of opaque thermoplastic resin. FIG. 5 illustrates a container body 2 in a hatched manner, in order to clarify the difference in appearance between the transparent blood collection tube T and the opaque (milky-white) washing solution container 1 as described later.

As shown in FIGS. 1 and 2, a label 6 having a bar code 5 printed thereon is attached to a prescribed position on an outer side surface of the container body 2. The bar code 5 stores identification information indicating that the washing solution container 1 contains the washing solution 4.

Figure 3:
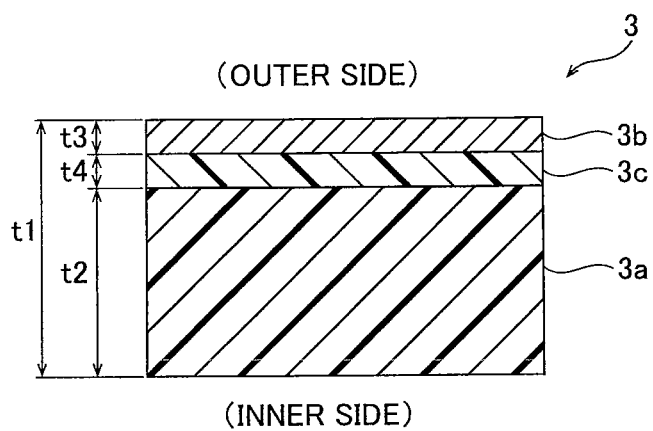
FIG. 3 is a schematic sectional view for illustrating the structure of a multilayer film of the washing solution container according to the embodiment of the present invention.

The multilayer film 3 has a circular shape, and is bonded to the upper end surface of the container body 2 (flange portion 2c). The multilayer film 3 covers the opening 2a of the container body 2, thereby sealing the container body 2. The multilayer film 3 is so formed that the diameter D1 thereof is slightly larger than the outer diameter D2 of the flange portion 2c of the container body 2, to be capable of sufficiently covering a peripheral edge of the end portion of the container body 2 on the side of the opening 2a. As shown in FIG. 3, the multilayer film 3 includes a seal layer 3a arranged on the side of the opening 2a of the container body 2 and a gas barrier layer 3b arranged on the outer side of the seal layer 3a. According to this embodiment, the multilayer film 3 has a three-layer structure including an intermediate layer 3c arranged between the seal layer 3a and the gas barrier layer 3b. The gas barrier layer 3b is the outermost layer.

The seal layer 3a has functions of bonding the container body 2 and the multilayer film 3 to each other and protecting the gas barrier layer 3b from exposure of the washing solution 4 (hypochlorite solution). The seal layer 3a is made of the same thermoplastic resin as the material of the container body 2, and bonded to the upper end surface of the container body 2 by heat sealing. In other words, the multilayer film 3 is bonded (heat-sealed) to the container body 2 without through a bonding layer (bonding agent). The sealing layer 3a and the container body 2 are directly contacted to each other. Therefore, a portion (inner side surface) of the washing solution container 1 directly in contact with the washing solution 4 is entirely made of the material resistant against the hypochlorite solution.

The gas barrier layer 3b has a function of preventing a penetration of external gas ($CO_2$ in particular) to an inside of the container, in order to prevent a decomposition of the hypochlorite solution in the washing solution 4. According to this embodiment, the gas barrier layer 3b consists of a ceramic deposition film prepared by depositing a ceramic material on a surface of a base film. The base film for the ceramic deposition film can be prepared from polyethylene terephthalate (PET) or oriented nylon (ONY), for example. The ceramic material can be prepared from alumina ($Al_2O_3$) or silica ($SiO_2$), for example.

The intermediate layer 3c consists of a polyamide layer, and has functions of improving a structural strength of the multilayer film 3 and protecting the gas barrier layer 3b. As a material of the intermediate layer 3c, a nylon material can be preferably used since it has an excellence in shock resistance and alkali resistance.

All of the seal layer 3a, the gas barrier layer 3b and the intermediate layer 3c are insulative, so that the multilayer film 3 is insulative as a whole. The multilayer film 3 has a total thickness t1. The seal layer 3a, the gas barrier layer 3b and the intermediate layer 3c have thicknesses t2, t3 and t4 respectively. The total thickness t1 is puncturable by a piercing pipette 34 (described later) of the blood analyzer 100. Total thickness t1 is about 150 μm according to this embodiment. Comparing the thicknesses t2, t3 and t4 of each layer, the thickness t2 of the seal layer 3a is the largest, so that the thickness t2 can be sufficiently maintained even if the seal layer 3a is deformed due to the heat sealing to the container body 2.

The container body 2 accommodates the washing solution 4. The washing solution 4 is a chlorine-based detergent. As the detergent, a potassium hypochlorite solution or a sodium hypochlorite solution can be suitably used. The washing solution 4 is alkaline. The washing solution container 1 accommodates the washing solution 4 of a prescribed concentration. After aspiration by the blood analyzer 100, the washing solution is diluted and used. When the washing solution 4 is prepared from a sodium hypochlorite solution, the chlorine concentration of the washing solution 4 (undiluted) in the washing solution container 1 is preferably at least 1% and not more than 12%. In order to reliably ensure a detergency, the chlorine concentration is more preferably at least 1.5% and not more than 7%. Decomposition of a chlorine-based washing solution is promoted when the liquid property approaches neutral, and hence the pH of the chlorine-based washing solution is preferably set to a high level, in order to improve preservation stability (for long-term preservation). Therefore, the pH of the washing solution 4 is set to at least 10, for example, and more preferably set to at least 11. If no long-term preservation is required, on the other hand, the chlorine concentration of the washing solution 4 may simply be keepable in the aforementioned range at the time of use, and the pH of the washing solution 4 may simply be at least 9, for example.

Exemplary application of the washing solution container 1 according to this embodiment to the blood analyzer 100 is now described.

Figure 4:
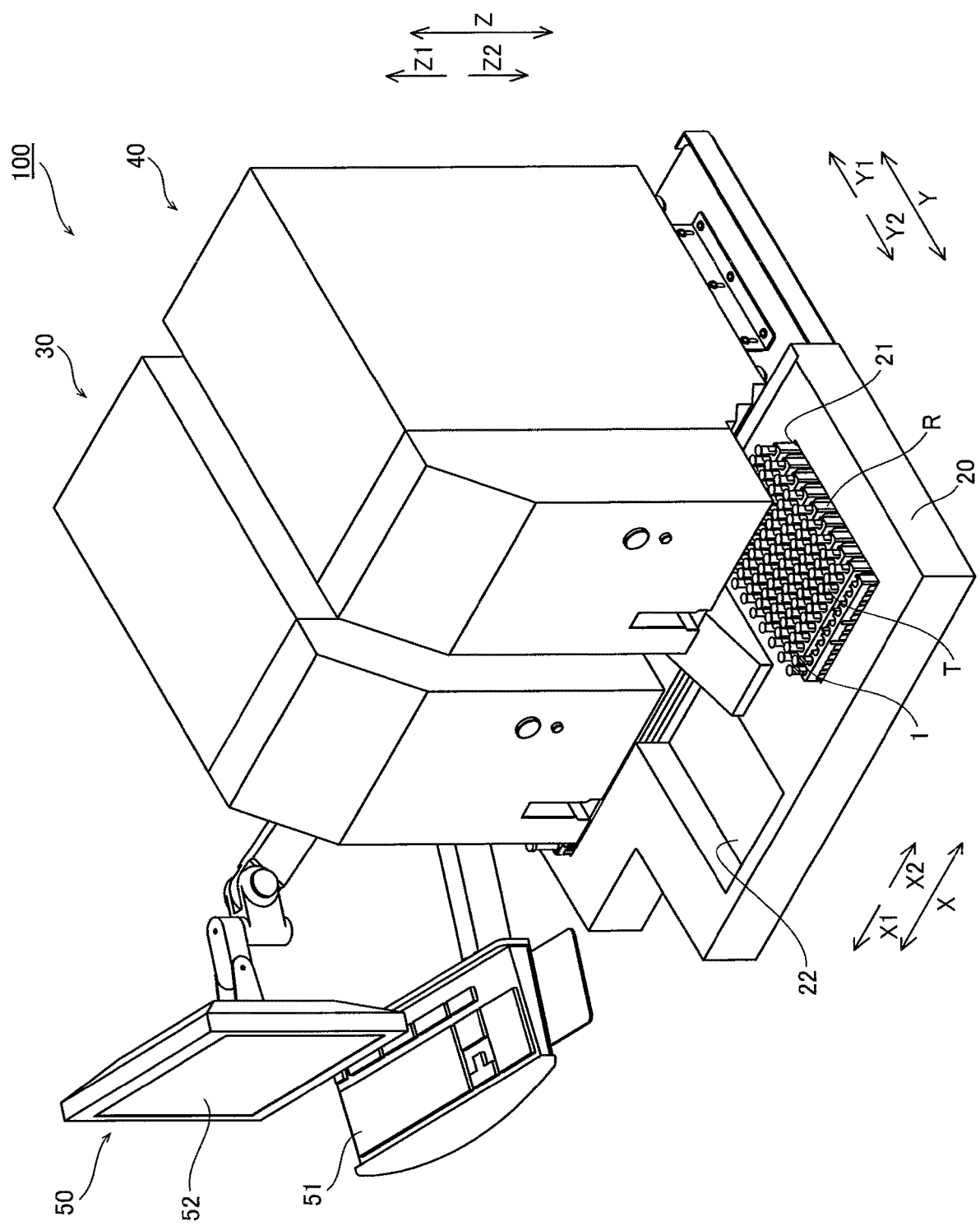
FIG. 4 is a perspective view showing an example of a blood analyzer to which the washing solution container according to the embodiment shown in FIG. 1 is applied.

First, an outline of the blood analyzer 100 employing the washing solution container 1 is described. As shown in FIG. 4, the blood analyzer 100 is a blood cell counter analyzing blood cell components contained in whole blood specimens. The blood analyzer 100 includes a transport unit 20, measurement units 30 and 40 consisting of blood cell counters, and an information processing unit 50, as shown in FIG. 4.

The blood analyzer 100 aspirates the blood specimens from the blood collection tubes T and analyzes the same. The blood collection tube T is made of transparent (translucent) glass or synthetic resin. The blood collection tube T has a form of a tubular container having a bottom portion, and has an opening upper end (not shown), as shown in FIG. 5. The blood collection tube T accommodates the whole blood specimen collected from a patient. The opening upper end is sealed with a lid member (rubber stopper) T1. A label T3 having a bar code T2, including a sample ID, printed thereon is attached to a side surface of the blood collection tube T. The blood collection tube T is transported to the measurement unit 30 or 40 by the transport unit 20 in a state loaded on the rack R. The washing solution container 1 according to this embodiment can be handled similarly to the blood collection tube T, and is loaded on the rack R to be supplied to the measurement unit 30 or 40. The rack R is formed to be capable of holding ten containers.

Figure 6:
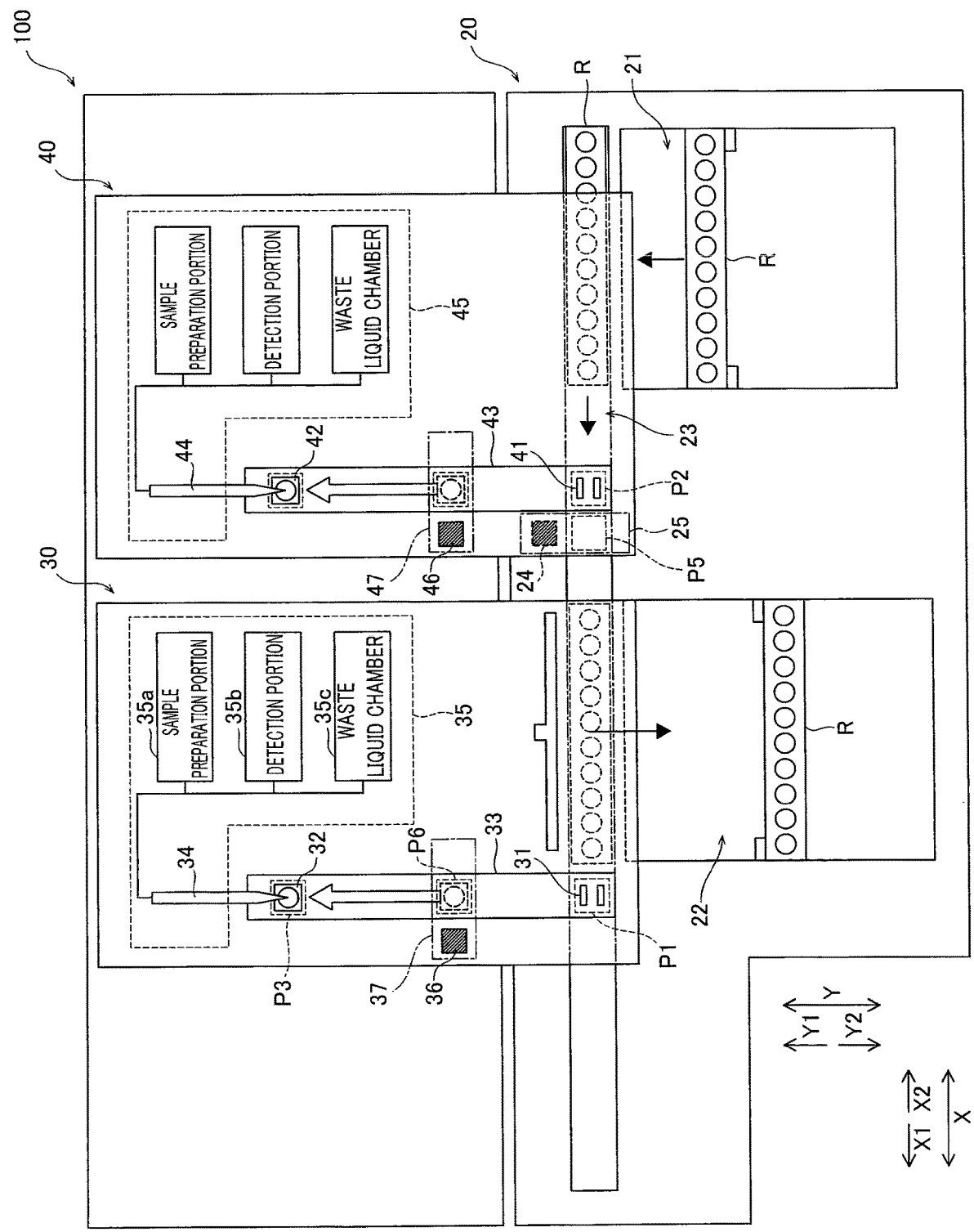
FIG. 6 is a planar schematic diagram for illustrating the structures of respective portions of the blood analyzer shown in FIG. 4.

As shown in FIG. 6, the transport unit 20 is arranged in front of the measurement units 30 and 40 (along arrow Y2) aligned in the lateral direction (direction X). The transport unit 20 includes right and left tables 21 and 22 for stocking racks R and a rack transport portion 23 extending in the direction X to connect the right and left tables 21 and 22 with each other for transporting the racks R. The rack R holding the blood collection tubes T or washing solution containers 1 are set in line on the right table 21, to be successively supplied to the rack transport portion 23. The rack transport portion 23 moves the racks R supplied from the right table 21, transports the same to the measurement units 30 and 40, and discharges racks R holding blood collection tubes T completely subjected to measurement to the left table 22. A bar code unit 25 including a bar code reader 24 is set on a prescribed position of the rack transport portion 23. The bar code unit 25 rotates the container held on the rack R, so that the bar code reader 24 scans bar code from side surfaces of the containers. Thus, the blood analyzer 100 is capable of reading bar code 5 or T2 attached to the side surface of container regardless of the direction of the barcode label in the racks R.

The measurement units 30 and 40 are identical in structure to each other. The measurement unit 30 (40) mainly includes a gripping portion 31 (41), a container holder 32 (42), a container transport portion 33 (43), the piercing pipette 34 (44) and a fluid system 35 (45). A bar code unit 37 (47) including a bar code reader 35 (46) is set in the measurement unit 30 (40). The structure of the measurement unit 30 is now described.

The gripping portion 31 is arranged above a prescribed position (removing position P1) of the rack transport portion 23. The gripping portion 31 grips a container (the blood collection tube T or the washing solution container 1) loaded on each rack R and removes the container from the rack R. The gripping portion 31 incorporates the removed container into the measurement unit 30. After completion of aspiration of the content, the gripping portion 31 returns the container to the rack R. Further, the gripping portion 31 inverts the grasped blood collection tube T to stir the blood specimen stored therein. The container holder 32 receives the container (the blood collection tube T or the washing solution container 1) incorporated by the gripping portion 31. The container transport portion 33 moves the container holder 32, to arrange the container at a suction position P3 (beneath the piercing pipette 34) in the measurement unit 30. The piercing pipette 34 has a sharp forward end portion, and is formed to be capable of puncturing the lid member T1 of the blood collection tube T. The piercing pipette 34 is also capable of puncturing the multilayer film 3 of the washing solution container 1. The piercing pipette 34 is lowered and inserted to the container arranged at a suction position P3, and aspirates the liquid stored therein.

The fluid system 35 is constituted of a sample preparation portion 35a, a detection portion 35b and a waste liquid chamber 35c for storing a waste liquid as well as flow paths connecting the sample preparation portion 35a, the detection portion 35b and the waste liquid chamber 35c with each other and feeding the liquid, valves and the like. The sample preparation portion 35a is constituted of a reaction chamber or the like for preparing a measurement sample by mixing aspirated blood specimen and a reagent with each other. The detection portion 35b has a function of measuring the prepared measurement sample, and is constituted of an electric resistance detector for measuring red blood cells and blood platelets, an optical detector for optically measuring white blood cells and the like.

In a measurement operation, the measurement unit 30 aspirates the blood specimen from a blood collection tube T with the piercing pipette 34, prepares the measurement sample in the sample preparation portion 35a, and feeds the measurement sample to the detection portion 35b for measuring the same.

In a washing operation, the measurement unit 30 aspirates the washing solution 4 from a washing solution container 1 with the piercing pipette 34. Thereafter, the measurement unit 30 causes the washing solution to be accumulated in the sample preparation portion 35a, the detection portion 35b and the flow path between these portions 35a and 35b as well as the flow path reaching the waste liquid chamber 35. The fluid system 35 is left for a prescribed time in this state. The contaminants (residues of the specimen and the reagent) accumulated on the inner walls of the sample preparation portion 35a, the detection portion 35b and the waste liquid chamber 35c are removed. Such washing with the washing solution container 1 is performed once a day or every prescribed measurement frequency (e.g. upon measurement of 1000 specimens), for example. The washing performed by filling the flow paths with the washing solution 4 requires a longer time as compared with the measurement of the specimen. Therefore, the blood analyzer 100 is preferably washed when the blood analyzer 100 is shutdown. The blood analyzer 100 according to this embodiment is programmed to be shut down when a washing with the washing solution container 1 is completed.

As shown in FIG. 4, the information processing unit 50 includes an input portion 51 and a display portion 52. Further, the information processing unit 50 is communicatively connected with the transport unit 20 and the measurement units 30 and 40. The information processing unit 50 controls operations of the transport unit 20 and the measurement units 30 and 40, and performs analysis on the basis of results of measurement performed by the measurement units 30 and 40. Further, the information processing unit 50 displays prescribed information such as a message on the display portion 52.

Outlines of the measurement and washing operations of the blood analyzer 100 are now described with reference to FIGS. 2 and 5 to 9.

Figure 7:
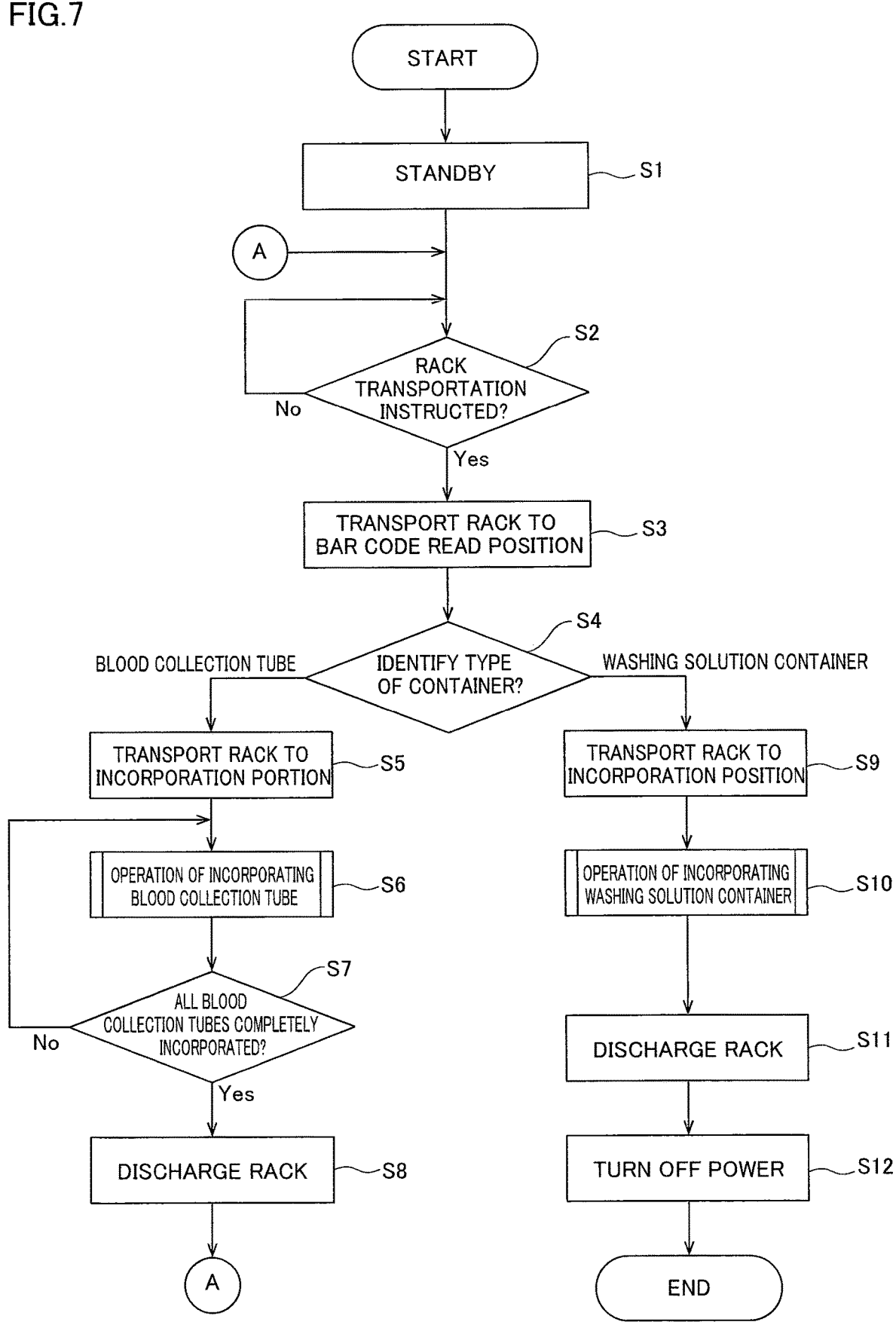
FIG. 7 is a flow chart for illustrating an operation of the blood analyzer shown in FIG. 4.

As shown in FIG. 7, the blood analyzer 100 first executes standby operation such as operation checking of the transport unit 20 and the respective portions of the measurement unit 30 (40) at step S1. After completion of the standby processing, the blood analyzer 100 waits for a rack transportation instruction at step S2.

A rack R holding blood collection tubes T to be subjected to measurement or washing solution containers 1 is set on the right table 21 of the transport unit 20 by an operator. When the rack transportation instruction is input by the operator, the process proceeds to step S3. As already described, the operator loads the blood collection tubes T on the rack R and sets the rack R on the right table 21 in a normal measurement operation. On the other hand, when the measurement operation for the day is terminated and the blood analyzer 100 is to be shut down, the operator loads only the washing solution containers 1 on the rack R and sets the rack R on the right table 21 of the transport unit 20. At the step S3, as shown in FIG. 6, the rack transport portion 23 transports the rack R from the right table 21 to the bar code read position P5. When the rack R arrives the bar code read position P5, the bar code reader 24 scans the bar codes of all containers (the blood collection tubes T or the washing solution containers 1) loaded on the rack R sequentially from the forehand container of the queue (along arrow X1).

As shown in FIG. 7, at step S4, the information processing unit 50 identifies the type of container (i.e. the blood collection tube T or the washing solution container 1) on the basis of the bar code information. When identifying the container as the blood collection tube T, the information processing unit 50 extracts sample ID from the bar code information. In processing subsequent to step S5, the information processing unit 5 executes the measurement operation based on a measurement order previously input in association with the sample ID.

At the step S5, the rack transport portion 23 transports the rack R to the removing position P1 or P2 (see FIG. 6). The measurement units 30 and 40 alternately remove and incorporate the blood collection tubes T sequentially from the forehand one of the queue of the blood collection tubes T (along arrow X1) of the rack R.

When the rack R is transported to the removing position P1 (P2), the process proceeds to step S6 (see FIG. 7). The measurement unit 30 (40) removes blood collection tube T from the rack R. The incorporating operation of the measurement unit 30 is now described.

Figure 8:
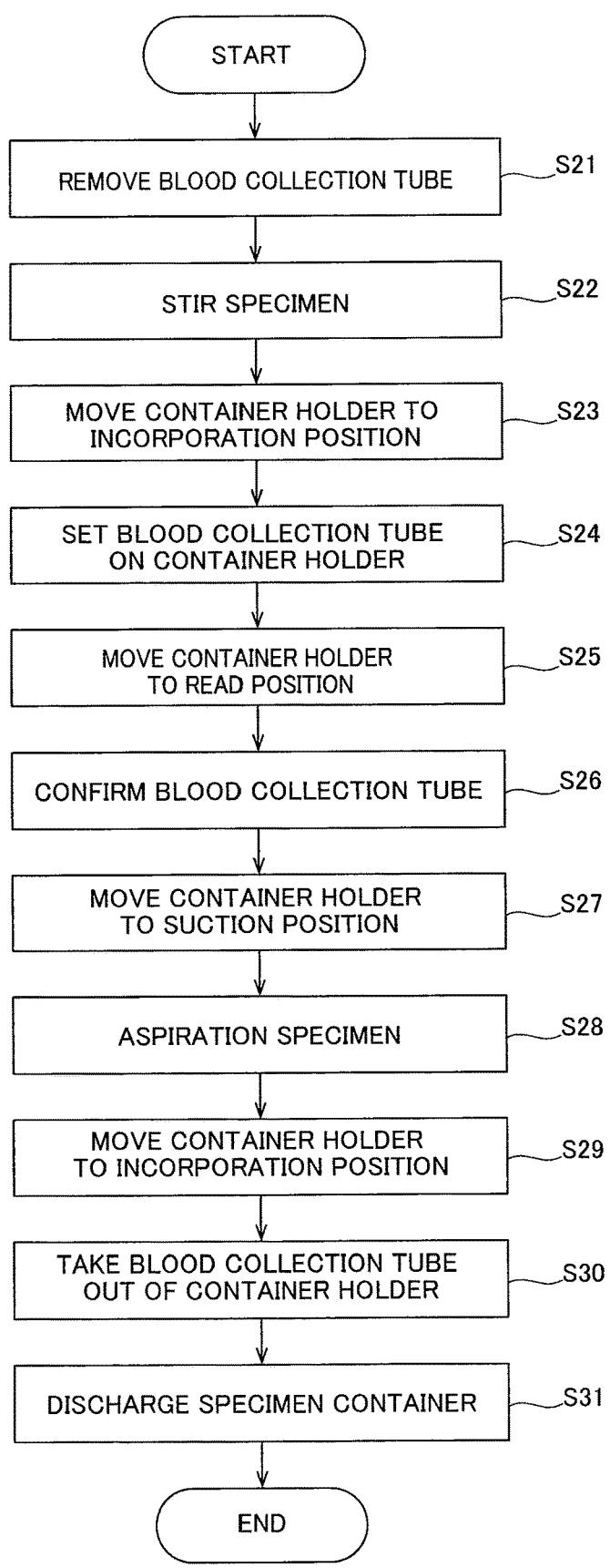
FIG. 8 is a flow chart for illustrating an operation (subroutine) of the blood analyzer incorporating a blood collection tube in the flow chart shown in FIG. 7.

As shown in FIG. 8, the gripping portion 31 removes blood collection tube T from the rack R (step S21). The gripping portion 31 stirs the blood specimen accommodated in the blood collection tube T (step S22). Thereafter the container holder 32 is moved to a position above the removing position P1 (step S23). The gripping portion 31 sets the blood collection tube T on the container holder 32 (step S24). The container holder 32 is moved to the read position P6 (step S25). The bar code reader 36 scans the bar code T2 of the blood collection tube T for a confirmation (step S26). After the confirmation of the blood collection tube T, the container holder 32 is moved to the suction position P3 (step S27). The piercing pipette 34 is lowered to pierce the lid member T1 (see FIG. 5) of the blood collection tube T. The piercing pipette 34 aspirates a predetermined quantity of the blood specimen from the blood collection tube T (step S28). The aspirated blood specimen is supplied to respective portions of the fluid system 35, to be subjected to prescribed measurement processing.

When the piercing pipette 34 completes an aspiration of the specimen, the processing proceeds to step S29, the container holder 32 returns to the position above the removing position P1. Then, the gripping portion 31 removes the blood collection tube T from the container holder 32 (step S30), and returns it to the original position of the rack R (step S31). Thus, incorporation operation of the measurement unit 30 completes. The measurement unit 40 also incorporates blood collection tube T similarly to the measurement unit 30.

After the measurement unit 30 completes the incorporation operation, the blood analyzer 100 determines whether or not the incorporation operation (step S6) has been completed for all blood collection tubes T on the rack R (step S7). The blood analyzer 100 repeats the steps S6 and S7, and thereby the respective blood collection tubes T on the rack R are incorporated into the measurement unit 30 or 40 in prescribed order. When incorporation operation for all blood collection tubes T are completed, the process proceeds to step S8. The rack R is discharged to the left table 22 (step S8). Thereafter the process returns to the step S1, to continue the measurement operation.

When the information processing unit 50 identifies the container as the washing solution container 1 at the step S4, the blood analyzer 100 shifts to a shutdown operation (steps S9 to S12).

First, the rack transport portion 23 transports the rack R to the removing position P1 or P2 (see FIG. 6). In a case of washing both of the measurement units 30 and 40, two washing solution containers 1 are loaded on the rack R, which in turn is sequentially transported toward the removing positions P1 and P2. When the rack R is transported to the removing position P1 (P2), the measurement unit 30 (40) executes an incorporation operation (step S10).

Figure 9:
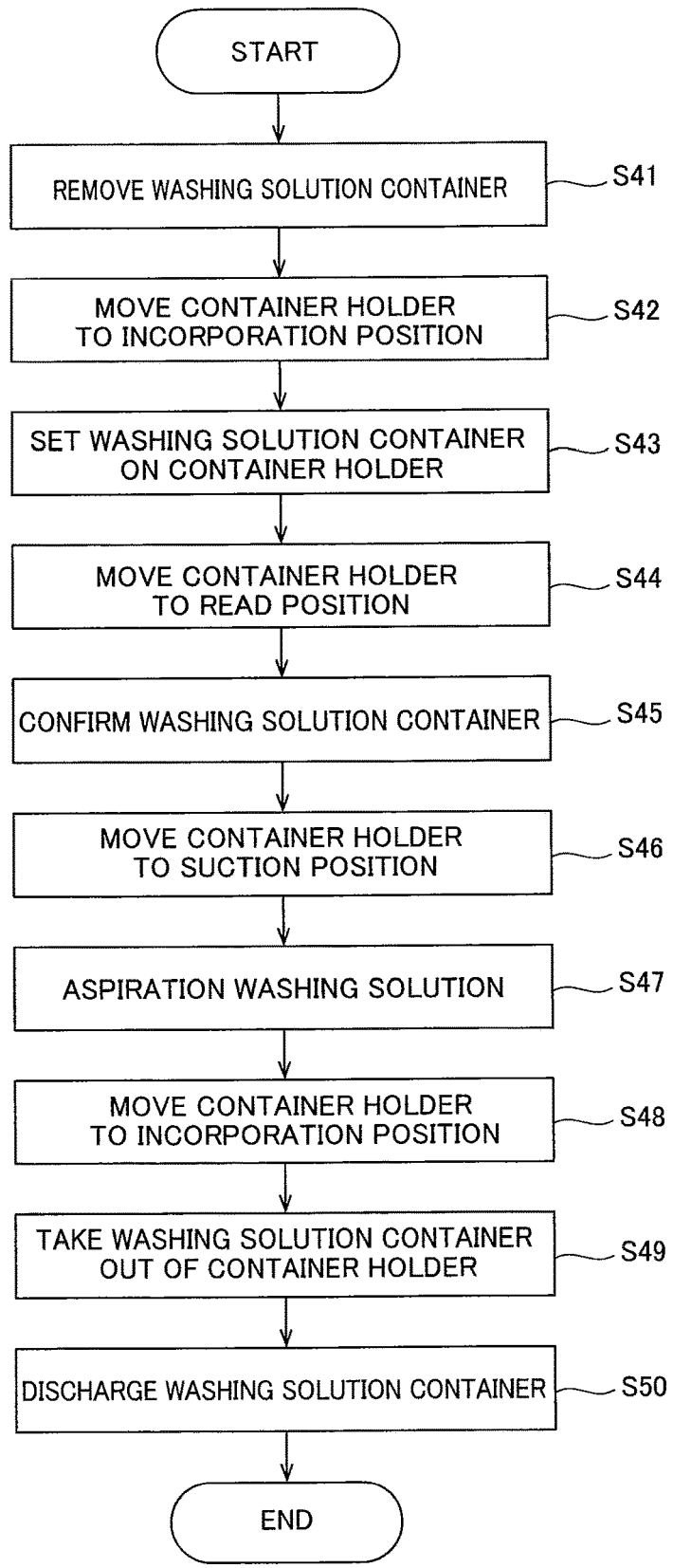
FIG. 9 is a flow chart for illustrating an operation (subroutine) of the blood analyzer incorporating a washing solution container in the flow chart shown in FIG. 7.

The incorporation operation of washing solution container 1 shown in FIG. 9 is carried out similarly to the steps S21 to S31 of the operation of incorporating the blood collection tube T shown in FIG. 8, except that the operation of stirring the content of the container (step S22 in FIG. 8) is omitted since the washing solution container 1 does not require to be stirred. Similarly to the aforementioned operation of the measurement unit 30 incorporating the blood collection tube T, the bar code reader 35 scans the bar code 5 (see FIG. 5) of the washing solution container 1 (step S45). The piercing pipette 34 is lowered at the suction position P3, pierces the multilayer film 3 (see FIG. 5) of the washing solution container 1 and aspirates the washing solution 4 (see FIG. 2) from the washing solution container 1 (step S47). The measurement unit 30 supplies the aspirated washing solution 4 to the respective portions of the fluid system 35. The supplied washing solution is stored in respective chambers and fills the flow paths thereby washing the fluid system 35. The quantity of the washing solution 4 in the washing solution container 1 is identical to or larger than that used for washing once the measurement unit 30 (i.e., for a single measurement unit) and less than a quantity used for washing twice the measurement unit 30. The information processing unit 50 controls the measurement unit 30 to aspirate substantially all quantity of the washing solution 4 from the washing solution container 1 (step S47). The reason for this is as follows.

The opening 2a of the washing solution container 1 according to this embodiment is sealed with not a rubber lid, but the multilayer film 3. Thus a hole made by the piercing will not be naturally closed, dissimilarly to a rubber lid of a blood collection tube. If the washing solution 4 remains in the washing solution container 1 after aspiration, it may leak out through the hole. Therefore, the measurement unit 30 aspirates all quantity of the washing solution 4, thereby preventing leakage of the washing solution 4.

As shown in FIG. 7, when the incorporation operation (step S10) for the washing solution container 1 is completed, the rack R to which the washing solution container 1 is returned is discharged to the left table 22 (step S11). When a prescribed time elapses after the fluid system 35 is filled with the washing solution 4, the measurement unit 30 discharges the washing solution 4 and the waste liquid from the blood analyzer 100. Thereafter the information processing unit 50 turns off the power of the blood analyzer 100, and terminates the process. Thus, the blood analyzer 100 is completely shut down.

According to this embodiment, the gas barrier layer 3b of the multilayer film 3 can prevent permeation of outside air. Also, the container body 2 and the seal layer 3a resistant against the chlorine-based washing solution 4 can prevent deterioration of the container 1, that may be caused by the content (i.e., chlorine-based washing solution 4). Thus, the washing solution container 1 can preserve the washing solution 4 over a long period while keeping the detergency. Further, the container body 2 is provided in the form of a blood collection tube, so the washing solution container 1 can be loaded on the rack R similarly to the blood collection tube T to be automatically supplied to the measurement unit 30 or 40. In addition, the bar code 5 for identifying the washing solution container 1 is assigned to the container body 2. It makes it possible that the washing solution container 1 can be automatically identified based on the bar code 5. Thus, the washing solution container 1 according to this embodiment can suppress permeation of outside air, prevent deterioration resulting from the content, and enable automatic handling by the blood analyzer 100.

According to this embodiment, the sodium hypochlorite solution is used as a detergent, and it yields a high detergency against protein in blood.

According to this embodiment, the multilayer film 3 is provided with the intermediate layer 3c which is provided between the seal layer 3a and the gas barrier layer 3b. The intermediate layer 3c is made of polyamide. Consequently, structural strength of the multilayer film 3 can be improved due to the intermediate layer 3c (polyamide layer). And the gas barrier layer 3b can be protected against the washing solution 4 exhibiting strong alkalinity.

According to this embodiment, the container body 2 and the seal layer 3a are made of the olefin-based resin. Thus the washing solution container 1 obtains a resistant against the hypochlorite solution and excellence in a structural strength.

According to this embodiment, the gas barrier layer 3b is made of the ceramic deposition film. This configuration effectively works as a gas barrier.

According to this embodiment, the seal layer 3a of the multilayer film 3 and the container body 2 are made of the same thermoplastic resin and heat-sealed to each other, whereby the seal layer 3a and the container body 2 can be strongly bonded. And a sealability of the boundary surfaces is improved. According to this structure, there is no need to consider an adhesiveness of bond with the multilayer film 3 and the container body 2 or chemical affinity between the bond and the content (chlorine-based washing solution 4).

According to this embodiment, the container body 2 is made of the opaque thermoplastic resin, so the washing solution container 1 can be easily distinguished from the transparent blood collection tube T.

EXAMPLES

A preservation test conducted in order to verify effects of this embodiment is now described with reference to FIGS. 10A and 10B. In this test, changes in available chlorine concentrations and pH values of washing solutions following lapses of preservation periods were measured as to Examples 1 and 2 (described later), in order to evaluate preservation stability of the washing solution container 1 according to this embodiment.

First, the configuration of washing solution containers employed for Examples 1 and 2 are described.

In Example 1, 4 mL of a sodium chlorite solution was dispensed as a chlorine-based washing solution 4 to a container body 2 (capacity: about 5 mL) of polypropylene (PP). The washing solution container 1 was sealed by heat-sealing with a multilayer film 3 having a three-layer structure. Respective layers are made of a ceramic deposition film (as gas barrier layer 3b), a nylon (NY) film (as polyamide layer 3c) and a polypropylene (PP) film (as seal layer 3a).

In Example 2, 4 mL of a sodium chlorite solution was dispensed as a chlorine-based washing solution 4 to a container body 2 (capacity: about 5 mL) of polyethylene (PE). The washing solution container 1 was sealed by heat-sealing with a multilayer film 3 having a three-layer structure. Respective layers are made of a ceramic deposition film (as gas barrier layer 3b), a nylon (NY) film (as polyamide layer 3c) and a polyethylene (PE) film (as seal layer 3a). The washing solution containers 1 according to Examples 1 and 2 were different from each other only in the materials for the container bodies 2 and the seal layers 3a.

As to the washing solution containers 1 according to Examples 1 and 2, the preservation test was conducted under an accelerated condition with a temperature load, to measure available chlorine concentrations and pH values of the washing solutions 4 at some measurement dates. A preservation temperature was set to 45° C. Reaction rates were converted to those corresponding to 30° C. (room temperature) on the basis of general reaction kinetics, that is, the reaction rate is generally doubled as temperature rises by 10° C. FIGS. 10A and 10B show the results of the test. As to Example 2, the preservation test was conducted over a longer period than that for Example 1, and two tests of Lots 1 and 2 were conducted.

As shown in FIG. 10A, the washing solution 4 according to Example 1 exhibited a pH value of 11.93 after a lapse of 3 months (converted as 30° C. preservation) from the initial value of 12.17. And it was proved that the pH has been maintained around 12. Further, the available chlorine concentration of the washing solution 4 according to Example 1 (initial concentration=4.98%) shows 3.33% after a lapse of 3 months (converted as 30° C. preservation). As shown in FIG. 10B, the pH value of the washing solution 4 according to Example 2 remained substantially unchanged after a lapse of 2.8 months (converted as 30° C. preservation) from the initial value in each Lot. And it was proved that the pH has been maintained around 12. Further, the available chlorine concentration of the washing solution 4 according to Example 2 (initial concentration=about 5% in each lot) shows about 3.2% after a lapse of 2.8 months (converted as 30° C. preservation). After a lapse of 7 months (converted as 30° C. preservation), the pH value was about 11 and the chlorine concentration was about 1.9%.

As already described, when a sodium hypochlorite solution is employed as a detergent, the available chlorine concentration in use is preferably at least 1%, and more preferably at least 1.5% in order to reliably ensure a detergency. Both of the washing solutions 4 according to Examples 1 and 2 exhibited available chlorine concentrations of about 3.2% to about 3.3% after a lapse of about 3 months (converted as 30° C. preservation). Therefore, each of the washing solutions 4 according to Examples 1 and 2 has a sufficient preservation stability capable of ensuring sufficient detergency after a lapse of 3 months. In Example 2 subjected to longer-period preservation test, the available chlorine concentration was more than 1.5% after a lapse of 7 months (converted as 30° C. preservation), and high preservation stability over a long period was confirmed. In general, decomposition of a chlorine-based washing solution is promoted when the liquid property thereof approaches neutral. Both of the washing solutions 4 according to Examples 1 and 2 maintained the pH values around 12 after the lapse of about 3 months (converted as 30° C. preservation). This means that the washing solutions 4 according to Examples 1 and 2 can excellently prevent the container bodies 2 from permeation of outside air ($CO_2$), suppress reduction of the pH values and effectively suppress decomposition of the detergent.

The aforementioned conversion condition "the reaction rate is doubled as temperature rises by 10° C." is based on general reaction kinetics. In an actual hypochlorite solution, it is estimated that the reaction rate is multiplied by about 3.5 as temperature rises by 10° C. In practice, therefore, it is observable that a preservation period of 39 days under a condition of 45° C. corresponds to about 6 months at 30° C., and a preservation period of 91 days under a condition of 45° C. corresponds to at least 14 months at 30° C.

The embodiment and Examples herein disclosed must be considered as illustrative in all points and not restrictive. The scope of the present invention is shown not by the description of the embodiment and Examples but by the scope of claims for patent, and all modifications within an equivalent to the scope of claims for patent are further included.

For example, the washing solution container is applied to the blood cell counter as the blood analyzer in the aforementioned embodiment, the present invention is not limited to this. The type of the blood specimen to be measured by the blood analyzer is not limited to a whole blood, but may be a blood serum or a blood plasma. Such a blood analyzer can be a blood coagulation analyzer, an immunoanalyzer or a biochemical analyzer.

The blood analyzer may include a pipette with a level sensor which detects an electric capacity. System of liquid aspiration mainly includes two types. One is a system aspirates a liquid by inserting a pipette into a container so that the tip end of the pipette reaches a vicinity of the inner bottom. Another is a system that senses a level of a liquid with a capacity type level sensor connected to the pipette and aspirates a liquid in the vicinity of the level. In a case of sensing the level of a liquid with a capacity type level sensor, false sensing may be caused when the pipette comes into contact with a conductive multilayer film. According to the aforementioned embodiment, however, the multilayer film of the washing solution container is insulative as a whole. Therefore the film is usable also for level sensing without causing false sensing. Thus, the washing solution container 1 is applicable to various types of blood analyzers.

The container bodies of the washing solution containers according to Examples 1 and 2 were made of polypropylene (PP) and polyethylene (PE) respectively, the present invention is not limited to this. According to the present invention, the container body may alternatively be made of olefin-based resin different from polypropylene or polyethylene. The container body may further alternatively be made of thermosetting resin other than the olefin-based resin. For example, the container body may be made of polyethylene terephthalate (PET) or the like. The material for the container body is not particularly restricted, so far as it is made of thermoplastic resin resistant against the chlorine-based washing solution. In this case, a material of the seal layer of the multilayer film may be selected from materials heat-sealable to the container body.

The washing solution container is provided with the multilayer film having the three-layer structure, that is, the seal layer, the gas barrier layer and the intermediate layer (polyamide layer) in the aforementioned embodiment, the present invention is not limited to this. According to the present invention, the washing solution container may alternatively be provided with a multilayer film having a two-layer structure of a seal layer and a gas barrier layer, or a multilayer film having at least four layers including a seal layer and a gas barrier layer. Further, a protective layer or the like may be provided on the outer side of the gas barrier layer, in order to prevent the gas barrier from external damage.

The multilayer film is provided with the gas barrier layer consisting of the ceramic deposition film in the aforementioned embodiment, the present invention is not limited to this. According to the present invention, the gas barrier layer may alternatively be made of a resin-based gas barrier film or the like other than the ceramic deposition film. Further alternatively, the gas barrier layer may be formed by directly depositing ceramic on the surface of the seal layer or the intermediate layer, in place of the ceramic deposition film employed as the gas barrier layer.

The bar code storing the identification information for the washing solution container is assigned to the container body in the aforementioned embodiment, the present invention is not limited to this. According to the present invention, the identification information for the washing solution container may alternatively be stored in a two-dimensional code (e.g. QR code) other than the bar code (one-dimensional bar code) or an RFID tag provided on the container body.

The label having the bar code, storing the identification information for the washing solution container, is attached to the container body in the aforementioned embodiment, the present invention is not limited to this. According to the present invention, a bar code 5 may alternatively be directly printed on a container body 102 as shown in FIG. 11, for example.

The container body is made of the semitransparent (opaque) thermoplastic resin in the aforementioned embodiment, the present invention is not limited to this. According to the present invention, the container body may alternatively be made of a transparent material. In order to distinguish the washing solution container from the generally transparent blood collection tube, however, the container body is preferably opacified. Further, the container body may be colored.

What is claimed is:

1. In combination, a container and a washing solution stored in the container, the combination configured for use by a blood analyzer, the combination comprising:
   a container body, having a form of a blood collection tube, made of a thermoplastic resin resistant to corrosion by a chlorine-based washing solution and having an opening on an upper end, wherein the chlorine-based washing solution is stored in the container body, the chlorine-based washing solution having a chlorine concentration of at least 1% and not more than 12%, and a pH of at least 9; and
   a multilayer film bonded to the container body to seal the opening,
   wherein the container body is only covered by the multilayer film,
   and wherein an identification code indicating that the container accommodates the washing solution is assigned to the container body, and
   the multilayer film consisting of:
   a non-rubber seal layer heat-sealed to the container body thereby sealing the opening, the seal layer made of the thermoplastic resin that is resistant to corrosion by the chlorine-based washing solution;
   a non-rubber gas barrier layer on an outer side of the seal layer that is resistant to $CO_2$ penetration; and
   a polyamide layer between the seal layer and the gas barrier layer,
   wherein the gas barrier layer is a ceramic deposition film including one of aluminum oxide or silica on a base film of polyethylene terephthalate or oriented nylon and covering a whole area of the opening, and
   wherein the thickness of the non-rubber seal layer is the largest among the layers of the multilayer film.

2. The combination according to claim 1, wherein the chlorine-based washing solution is a hypochlorite solution.

3. The combination according to claim 2, wherein the chlorine-based washing solution is a sodium hypochlorite solution.

4. The combination according to claim 1, wherein the container is employed for washing the blood analyzer, the blood analyzer including a pipette for piercing a lid of a blood collection tube and aspirating blood therefrom.

5. The combination according to claim 1, wherein the thermoplastic resin is olefin-based resin.

6. The combination according to claim 5, wherein the olefin-based resin is polyethylene or polypropylene.

7. The combination according to claim 1, wherein the container body is made of an opaque thermoplastic resin.

8. The combination according to claim 1, wherein the upper end of the container body has a flange protruding circumferentially, and the multilayer film is bonded to the flange.

9. The combination according to claim 8, wherein the multilayer film has a circular shape and a diameter larger than the diameter of the flange portion.

10. The combination according to claim 1, wherein the identification code is assigned in a form of a bar code.

11. The combination according to claim 1, wherein the quantity of the chlorine-based washing solution is identical to or larger than a quantity used for washing once the blood analyzer and less than a quantity used for washing twice the blood analyzer.

12. The combination according to claim 1, wherein the gas barrier layer is an outermost layer of the multilayer film.

13. The combination according to claim 1, wherein a total thickness of the multilayer film is about 150 μm.

* * * * *